United States Patent Office 3,148,100
Patented Sept. 8, 1964

3,148,100
COMPOSITION AND PROCESS FOR POWDERLESS ETCHING

Lewis W. Elston, Atlanta, Ga., assignor to Photo-Engravers Research, Inc., Savannah, Ga., a corporation of Georgia No Drawing. Filed June 8, 1961, Ser. No. 115,619
9 Claims. (Cl. 156—14)

This invention relates to the etching of photoengraving copper. More particularly, it relates to powderless etching, and provides a novel procedure for powderless etching and a novel composition for use in the procedure, whereby improvement in powderless etching is realized.

Photoengraving copper printing plates, which can be copper or brass, are made by depositing a photosensitive film on the plate, impressing on the film the image to be printed by exposing the film to light passed through a negative of the image, removing the unexposed film (which overlies the image area), and providing the remainder of the film (which serves to define the image area) in a hardened and acid resistant condition by chemically treating or by baking this portion of the film. The plate is then contacted with an etching solution, and the solution attacks the copper of the image area, but not the copper covered by the acid resistant coating, whereby the image is provided in relief on the plate.

From a consideration of the foregoing, it will be readily apparent that in order to accurately produce the image on the plate, it is necessary to control the extent to which the etching solution etches the sidewalls which form about the periphery of the image area as the etching progresses. With respect to etching of the sidewalls, this can be considered as involving two actions on the sidewalls. One of these is the reduction of printing area due to sidewall etching and is referred to or measured as "etch factor," and the other is "undercutting action" which is the tendency for removal of metal from beneath edge portions of the acid resistant coating. Etch factor is the ratio of depth of etch remote from the sidewall to sidewall etch at the printing surface (i.e. the surface contacting the acid resistant coating). As to undercutting, speaking in reference to the etching of type characters, in the case of actual undercutting, the base of the characters would be narrower than the printing surface for the characters. In general, the base is broader than the printing surface, and the problem is to provide a suitable sidewall slope inwardly from the edge of the acid resistant coating to the plane of the image area provided in relief by the etching. Actual undercutting is undesirable; a right angle sidewall is suitable but in general is not a practical condition to maintain, rather, in general, some inward slope is tolerable, but the inward slope should not be excessive so as to significantly reduce the image area in relief. In the past, a suitable etch factor has been provided and undercutting has been controlled by periodically interrupting the etching procedure and burning an acid resistant coating onto the sidewalls. Thus, at intervals during etching, the plates were removed from the etching bath, dried, treated to deposit powder on the sidewalls, and then fired to convert the powder to an acid resistant film. This manner of preventing undercutting has the obvious disadvantage of requiring frequent interruption of the etching procedure. To obviate this disadvantage, it has been proposed to utilize a procedure wherein an acid resistant film is formed on the sidewalls as etching progresses. Thus, the sidewall protective film is provided, so to speak, automatically as etching proceeds, and the periodic interruption of the etching is unnecessary. This new procedure is termed "powderless etching." It has been used successfully for the production of photo-engraving copper printing plates.

The basic powderless etching process is described in Jones Patent 2,746,848. As is described in the Jones patent, thiourea is included in the etching bath and as etching proceeds a protective covering forms on the sidewalls of the image area. The same covering which forms on the sidewalls, of course, tends to form on other exposed copper surface and, therefore, tends to form throughout the image area. To accommodate this condition, the etching procedure is modified so that any film formed on the image area is promptly removed. This is done by employing a splashing technique to contact the etching solution and the plate. The solution in splash form travels a course substantially perpendicular to the image area, and upon striking the image area, abrades away any film which has formed. The splash, of course, also strikes the sidewalls, but the angle of incidence with the sidewalls is such that the protective film on the sidewalls is not removed. Further, the etching solution also strikes the acid resistant coating which defines the image area. This, however, is without significance since the acid resistant coating is not affected by impingement of the etching solution. An alternative to the splashing process, is to carry out the etching while the plates are immersed in the etching solution, and removing the film from the image area, but not from the sidewalls, by suitably brushing the image area.

Instead of using thiourea as the sidewall protective film precursor, the dimer of thiourea, formamidine disulfide, can be used. The use of formamidine disulfide is described in co-pending application Serial No. 732,419, filed May 2, 1958, and issued May 8, 1962, as U.S. Patent No. 3,033,793.

The instant invention provides other precursors for the sidewall protective film and, in addition, provides compositions, including the new precursor.

The precursors of the instant invention are ethylene thiourea, also known as 2-imidazolidine thione, and substituted ethylene thiourea. The compositions of the invention comprise ethylene thiourea or substituted ethylene thiourea and formamidine disulfide. Further, the compositions can include an anti-caking agent, and can contain thiourea.

Broadly considered then, according to the invention, in a powderless etching process, wherein the copper in the image area is contacted with an etching solution, and wherein a protective film forms about the periphery of the image area to protect the sidewalls and thereby provide a suitable etch factor and control undercutting, there is included in the etching solution ethylene thiourea, or substituted ethylene thiourea.

Suitable substituted ethylene thiourea compounds are those in which one or more of the hydrogen atoms is replaced by an alkyl group or an aryl group, or those in which an acyl group is joined to the sulfur atom, representative members of such groups being methyl, ethyl, propyl, isopropyl, phenyl, diphenyl, acetyl, propionyl, and butyryl, and there being the proviso that there can be one or more substituents on the ring and the substituents can be alike or different, and the further proviso that the substituted ethylene thiourea have water solubility of at least 0.5 gram per liter. Ethylene thiourea has been found to be particularly well suited to the purposes of the invention.

In powderless etching using thiourea, formamidine disulfide, or ethylene thiourea, the protective film which forms on the sidewalls has a gelatinous appearance and is probably a complex compound, including copper ions and a moiety corresponding to the urea derivative used as a precursor. Compared with the known precursors, thiourea and formamidine disulfide, ethylene thiourea provides a much more adherent and impervious film on the sidewalls. Using ethylene thiourea alone, provides relatively great inhibition of undercutting action, so that the sidewalls assume a relatively low slope inwardly from the edge of the acid resistant coating to the plane of the image area. With formamidine disulfide or thiourea, on the other hand, the sidewalls approach more closely a right angle to the plane of the image area. Further, in the case of thiourea and formamidine disulfide, there is a limit on the depth of etch which can be realized without incurring actual undercutting. Thus, for thiourea or formamidine disulfide, if the depth of etch exceeds about 0.006–0.010 inch, actual undercutting will commonly be encountered. On the other hand, the slope of the sidewalls when ethylene thiourea is employed, may be so low as to be objectionable in that the area having the desired depth of etch is significantly less than the intended image area, due to sloping of the sidewalls.

Thus, depending on the depth of etch, thiourea and formamidine disulfide do not provide a sufficiently adherent or impervious film, whereas ethylene thiourea may provide excessive sidewall protection. It has been found that by using a mixture of thiourea or formamidine disulfide and ethylene thiourea, there can be obtained compositions having properties intermediate those of the constituents. By proportioning the components of the composition, therefore, it is possible to obtain a sidewall protective film precursor having properties suited for a particular etching job.

For relatively deep etching, i.e. in excess of say 0.010–0.15 inch ethylene thiourea is used to greatest advantage when it is used in combination with another precursor such as formamidine disulfide. For shallow etching, such as halftone work, it can be used alone.

As well as the depth of etch influencing the selection of a sidewall protective layer precursor, the manner in which the etching is performed is significant. Thus, for splash etching with machines, as are now used in the art, ethylene thiourea alone would for certain etching tasks, as has been noted above, provide too much protection. If, however, the force of the splashing against the copper were increased, sidewall protective film would be abraded so that the slope would be increased to the extent that the film would be suitable even for very deep etching.

As to particular compositions, the combination of ethylene thiourea and formamidine disulfide is preferred. Formamidine disulfide is used in the form of its dihydrochloride or other suitable mineral acid salt. While the proportion of these ingredients may vary over the full range of possible proportions, in general, a proportion of ethylene thiourea to formamidine disulfide of 0.15–4.0 (0.15 part ethylene thiourea to 4.0 part ethylene thiourea per part of formamidine disulfide dihydrochloride), will be desirable. This proportion can be 0.15–3.0. A preferred range is 1.0–1.75 and a proportion of 1 is well suited to the purpose of the invention. Thiourea can replace all or part of the formamidine disulfide.

The concentration of the ferric chloride can be in the range of 26–46° Bé., preferably 30° Bé. The amount of sidewall protective film precursor added to the bath can be 0.5 to about 10, preferably 0.5–5, grams per liter. Lesser amounts can be used, but in geenral, this is undesirable since the advantages of the invention are then not fully realized. On the other hand, greater amounts can be used, but this will usually be undesirable since usually such amounts would not provide any added advantage, and may have the disadvantage of complicating prevention of film formation on the image surface. The upper limit on the amount of precursor however, is the solubility thereof in the medium, since if the abrading force whereby the formation of a film on the image surface is increased to compensate for increased amounts of precursor, the system continues to be operative notwithstanding the high concentration of precursor. As to practical quantitative amounts of ethylene thiourea, there can be mentioned, from a fraction of a gram per liter up to 10 grams per liter, and more or less can be used with the caveats, however, mentioned for the materials of the invention generally.

The ethylene thiourea or the ethylene thiourea-containing compositions are preferably packaged as powdered materials. These powdered materials tend to cake and, accordingly, it is desirable to include therein an anti-caking agent. It has been found that pyrogenic silica is well suited as such an agent. This is a fine flocculated silica, available under the trademark Cab-O-Sil and is manufactured by Gofrey L. Cabot Company, of Boston, Mass. About 10 grams of pyrogenic silica per pound of precursor material is effective. The silica does not adversely affect the functioning of the urea derivatives in providing sidewall protection.

Representative compositions, and ones which have been found to be well suited to the purposes of the invention, are the following:

FORMULATION 1

| | Parts |
|---|---|
| Ethylene thiourea | 71.6 |
| Formamidine disulfide·2HCl | 26.4 |
| Thiourea | 2.0 |

FORMULATION 2

| | |
|---|---|
| Ethylene thiourea | 110 |
| Formamidine disulfide·2HCl | 100 |

In these formulations, the units are parts by weight.

As noted above, ethylene thiourea can be used for relatively shallow or relatively deep etching. For deep etching, it is preferable to use ethylene thiourea in combination with another precursor, such as thiourea or formamidine disulfide, and while ethylene thiourea can be used alone for shallow etching, it is advantageous, even for shallow work, to use it in combination with said other precursors.

The materials of this invention can be used as is known for the use of thiourea and formamidine disulfide. Thus, the materials can be dissolved in a ferric chloride bath, formulated for the etching of photoengraving copper. The material of the invention can be included in the bath, by merely adding the material in powdered form, and stirring to effect dissolution. The temperature can be about 80° F.±1°. An advantage to using material of the invention is that the effectiveness of the etching solution is less dependent on temperature than is the case if a precursor other than ethylene thiourea is used. The photoengraving copper can be copper or brass or other alloy as is commonly etched with ferric chloride solutions.

The invention is further described in the following specific example.

*Example*

To a 30° Bé. ferric chloride etching solution there is added 2–3 grams per liter of a powdered mixture of ethylene thiourea, formamidine disulfide, and pyrogenic silica, the mixture being according to Formulation 2, above. The bath is stirred to effect dissolution and to distribute the added materials uniformly therein. It is then employed for etching copper plates, having a resistant coating partially covering the plate, so as to define the image. The etching is performed in a splash machine having an 8" diameter paddle wheel and operated at 600 r.p.m. Etching temperature is 80° F.±1°, etching time is 10 minutes. The depth of etch in a 0.020 inch circle is about 0.004 inch, and in open area is about 0.014 inch, and sidewall protection is good so that undercutting does not occur.

While the invention has been described with reference to particular embodiments thereof, modifications and variations will occur to those skilled in the art, and it is desired to secure by these Letters Patent all such alterations.

What is claimed is:

1. In a process of etching photoengraving copper to make therein an image in relief and including contacting the copper in the image area with an aqueous ferric chloride etching solution to make the image in relief therein, and forming a protective film about the periphery of the image area to provide a suitable etch factor and control undercutting, the step which comprises including in the etching solution a member of the group consisting of as a solute therein ethylene thiourea and substituted ethylene thiourea having a solubility of at least 0.5 gram per liter in water, in amounts effective to aid the forming of the protective film, and thus improve etching by said solution.

2. The process of claim 1, wherein the amount of ethylene thiourea compound included in the etching solution is 0.5 to about 10 grams per liter.

3. The process of claim 1, wherein there is also included in the etching solution formamidine disulfide, the total amount of ethylene thiourea compound and formamidine disulfide being up to about 10 grams per liter.

4. The process of claim 3, wherein said ethylene thiourea compound is ethylene thiourea and wherein the weight proportion of ethylene thiourea to formamidine disulfide ranges from about 0.15 to 4.

5. An aqueous ferric chloride solution for the powderless etching of copper containing 26 to 46° Bé. aqueous ferric chloride solution, a film forming compound solution selected from the group consisting of thiourea and formamidine disulfide, together with a second film forming compound selected from the group consisting of ethylene thiourea and substituted ethylene thiourea having a solubility of at least 0.5 gram per liter of water, the combination of said film forming compounds being utilized in sufficient amounts to form an effective protective film during etching.

6. The composition of claim 5 wherein at least 0.5 to 10 grams per liter of said combination of film forming compounds are present in said bath, and the ratio of said member of the group consisting of ethylene thiourea and substituted ethylene thiourea to a compound selected from the group consisting of formamidine disulfide and thiourea ranges from 0.15 to 4, with said ethylene thiourea compound being utilized in a quantity of at least 0.5 gram per liter.

7. An aqueous ferric chloride solution for the powderless etching of copper and of 26 to 46° Bé. ferric chloride concentration which further contains formamidine disulfide and ethylene thiourea, said bath containing at least 0.5 gram per liter of ethylene thiourea with the weight ratio of ethylene thiourea to formamidine disulfide ranging from 0.15 to 4.

8. In a process of etching photo-engraving copper having a portion of its surface masked with a resistant coating to define an image area from which copper is to be dissolved to make an image in relief therein, including contacting the masked and unmasked portions with an aqueous ferric chloride etching solution to make the image in relief therein and forming a protective film about the periphery of the image area to provide a suitable etch factor and control undercutting, the improvement which comprises including in the etching solution at least 0.5 gram per liter of ethylene thiourea, and formamidine disulfide, the total amount of ethylene thiourea and formamidine disulfide being up to 10 grams per liter and the weight proportion of ethylene thiourea to formamidine disulfide being about 1.

9. In a process of etching photo-engraving copper to make therein an image in relief including contacting the copper in the image area with a ferric chloride etching solution, improvement which comprises including in the ferric chloride etching solution 0.5 to 10 grams of ethylene thiourea so as to form a protective film and thereby provide suitable etch factor and control undercutting.

References Cited in the file of this patent

UNITED STATES PATENTS

| | | |
|---|---|---|
| 3,033,725 | Daugherty et al. | May 8, 1962 |
| 3,033,793 | Bradley et al. | May 8, 1962 |

OTHER REFERENCES

Condensed Chemical Dictionary, Rheinhold Publishing Co., copyright 1956, 1961, p. 469.